United States Patent
Nardini

(10) Patent No.: US 8,364,168 B2
(45) Date of Patent: Jan. 29, 2013

(54) METHOD FOR COMPUTING THE GEOGRAPHICAL LOCATION OF A MOBILE TERMINAL

(75) Inventor: Massimo Nardini, Milan (IT)

(73) Assignees: Vodafone Group PLC, Newbury, Berkshire (GB); Vodafone Omnitel N.V., Milan (IT)

(*) Notice: Subject to any disclaimer, the term of this patent is extended or adjusted under 35 U.S.C. 154(b) by 213 days.

(21) Appl. No.: 12/529,374

(22) PCT Filed: Feb. 26, 2008

(86) PCT No.: PCT/EP2008/052323
§ 371 (c)(1),
(2), (4) Date: May 6, 2010

(87) PCT Pub. No.: WO2008/104545
PCT Pub. Date: Sep. 4, 2008

(65) Prior Publication Data
US 2010/0222077 A1    Sep. 2, 2010

(30) Foreign Application Priority Data
Mar. 1, 2007   (IT) .............................. MI2007A0412

(51) Int. Cl.
*H04W 24/00* (2009.01)
(52) U.S. Cl. .................. 455/456.1; 455/404.2; 455/418; 455/436; 455/456.2; 455/456.3; 455/456.5; 455/456.6; 455/457; 370/310.2; 370/328; 370/331
(58) Field of Classification Search .............. 455/404.2, 455/418, 436–444, 456.1–457; 370/310.2, 370/328, 331–334
See application file for complete search history.

(56) References Cited

U.S. PATENT DOCUMENTS
6,564,065 B1 * 5/2003 Chang et al. .................. 455/457
(Continued)

FOREIGN PATENT DOCUMENTS
FR    2 859 348    3/2005
GB    2 364 617    1/2002

OTHER PUBLICATIONS

Kunczier H et al: "Enhanced cell ID based terminal location for urban area location based applications" Consumer Communications and Networking Conference, 2004. First IEEE, Las Vegas, NV, Piscataway, NJ, USA,IEEE, (Jan. 5, 2004), pp. 595-599.

(Continued)

*Primary Examiner* — Steve D Agosta
(74) *Attorney, Agent, or Firm* — B. Aaron Schulman, Esq.; Nicholas B. Trenkle, Esq.; Stites & Harbison PLLC

(57) ABSTRACT

The invention relates to a method for computing the geographical location of a mobile terminal (MT) in a cellular telecommunications network. The method includes the steps of collecting identifiers of possible serving cells for the mobile terminal, selecting from a first database (A) geographical coordinates (LONG, LAT) whose expected serving cell ID matches any one of the identifiers of possible serving cells, comparing, for each selected geographical coordinate (LONG, LAT), pairs of cell identifiers and corresponding expected received signal values associated with the geographical coordinate (LONG, LAT) in the first database (A) with pairs of cell identifiers and corresponding actual received signal values of the possible serving cells to determine the geographical locations (LONG, LAT) having a number of matches (NMATCH) greater than a predetermined match threshold (THRESHOLD-NMATCH) and finally processing the geographical locations so determined (LONG, LAT) to obtain the geographical location of the mobile terminal (MT).

12 Claims, 2 Drawing Sheets

U.S. PATENT DOCUMENTS

Figure 1:
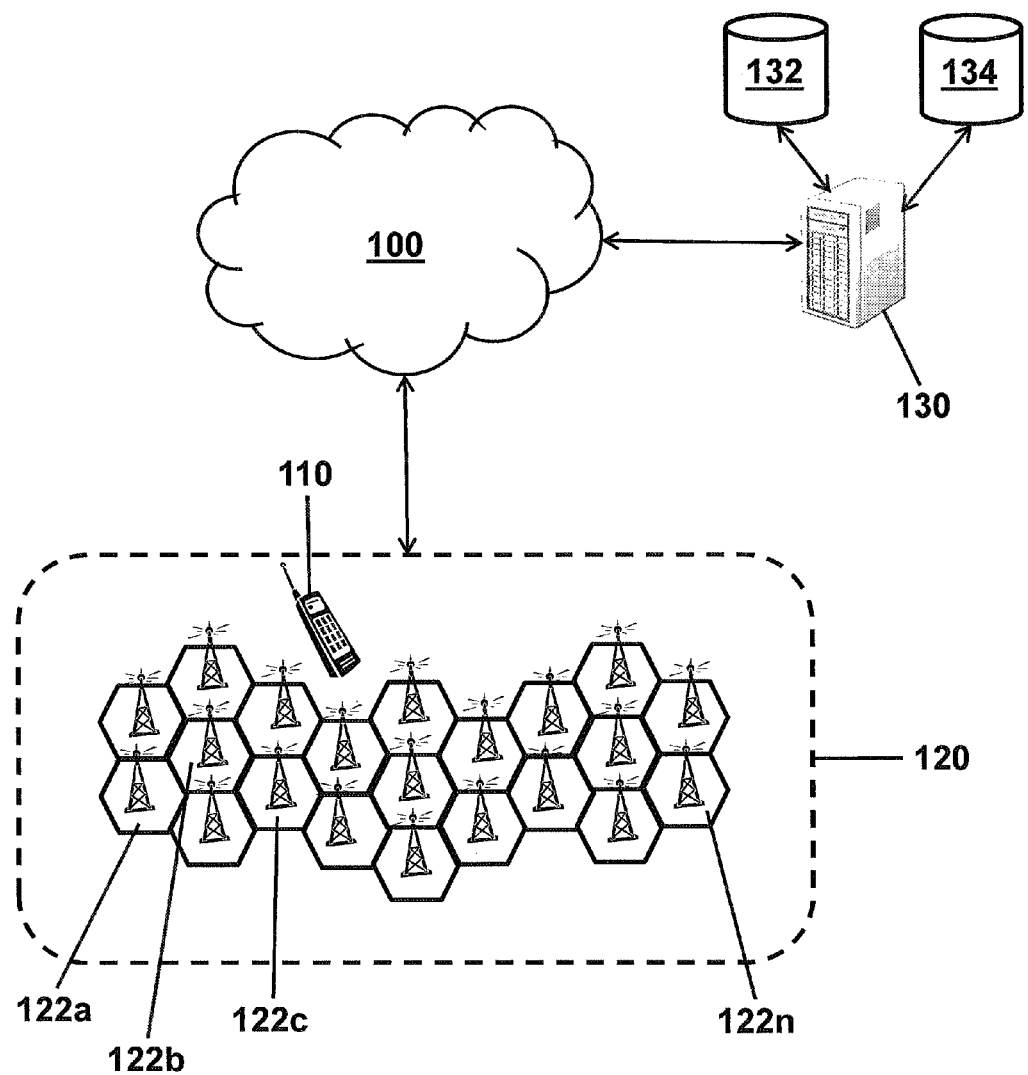

| | | | |
|---|---|---|---|
| 7,043,257 B2 * | 5/2006 | Nohara | 455/456.6 |
| 7,742,754 B2 * | 6/2010 | Yahagi | 455/404.2 |
| 2003/0087647 A1 | 5/2003 | Hurst | |
| 2006/0293058 A1 * | 12/2006 | Alicherry et al. | 455/446 |
| 2009/0011779 A1 | 1/2009 | MacNaughtan et al. | |

OTHER PUBLICATIONS

Gaspard I et al: "Position assignment in digital cellular mobile radio networks (e.g. GSM) derived from measurements at the protocol interface" Vehicular Technology Conference, 1997, IEEE 47th Phoenix, AZ, New York, NY, vol. 2, (May 4, 1997), pp. 592-596.

* cited by examiner

METHOD FOR COMPUTING THE GEOGRAPHICAL LOCATION OF A MOBILE TERMINAL

FIELD OF THE INVENTION

The present invention relates to a method for computing the geographical location of a mobile terminal.

BACKGROUND OF THE INVENTION

Methods are known in the art for computing the location of a mobile terminal.

FR 2 859 348 discloses a process for geographical location of a mobile terminal in a telecommunications network. The process involves the use of data previously requested by the system and combined with calculation of the speed and direction of the mobile terminal, using a digital database. The process includes processing of data held in the SIM card of the mobile terminal without using a remote server. Particularly, the process provides position calculation from data previously requested within the system, followed by calculation of speed and direction from a historical database.

WO 2006/105619 discloses a method and system for computing the location of a mobile terminal in a telecommunications network. According to this method, the mobile terminal collects radio signal parameter measurement data and transmits such data to a network processor for location computing. Particularly, the method involves accumulation of radio parameter measurements from a plurality of measurement cycles.

While the above methods allow computation of the mobile terminal position, they still have a considerable complexity and require large storage availability in the mobile terminal for holding much data, and require changes in the mobile terminal firmware for complex computing.

Thus, the need arises of providing a method for computing the geographical location of a mobile terminal that is of simple execution and allows quick computation of the mobile terminal position.

SUMMARY OF THE INVENTION

In view of the prior art as described above, the object of the present invention is to provide a method for computing the geographical location of a mobile terminal that can obviate the prior art drawbacks.

According to the present invention, this object is fulfilled by a method for computing the geographical location of a mobile terminal as defined in claim 1.

Further characteristics and advantages of the method for computing the geographical location of a mobile terminal according to this invention, will be apparent from the following description of one preferred embodiment thereof, which is given by way of illustration and without limitation.

BRIEF DESCRIPTION OF THE DRAWING FIGURES

The above-mentioned and other advantages, special features and practical refinements of the invention are also explained on the basis of the description below of exemplary embodiments and provided with reference to the figures.

Figure 2:
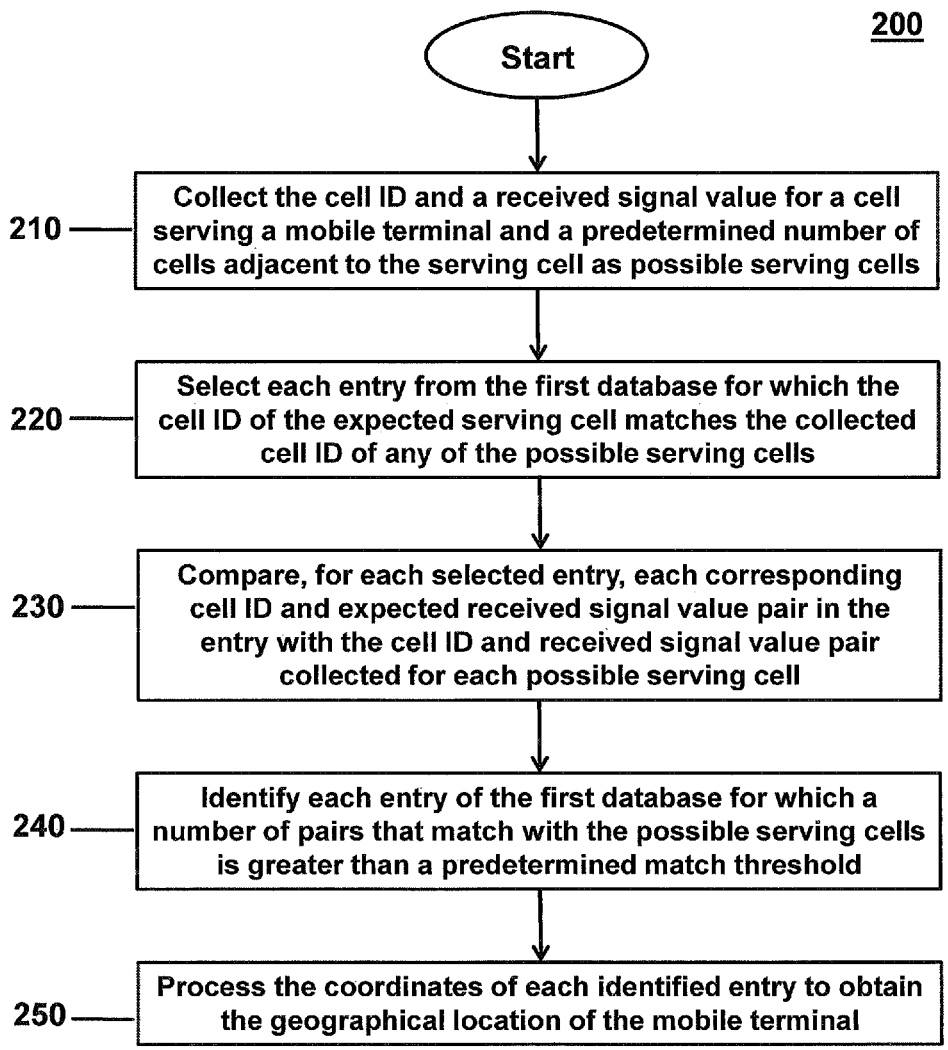

FIG. 1 is a diagram showing a schematic representation of a communication system in accordance with an exemplary embodiment of the present invention; and FIG. 2 is a flowchart showing an exemplary embodiment of a process for computing a geographical location of a mobile terminal in a cellular telecommunications network in the communication system illustrated in FIG. 1 in accordance with the present invention.

In general, FIG. 1 shows a schematic representation of an exemplary communication system with a cellular telecommunications network 100 that contains an infrastructure for establishing connections to mobile terminal devices, such as mobile terminal device 110 shown by way of an example in FIG. 1. Telecommunications network 100 is connected with a plurality of base stations that each comprise a radio interface for access to the communication system in an associated geographic region or cell. More specifically, telecommunications network 100 includes a respective plurality of cells 122a-122n provided within an area 120, and each cell is associated with a plurality of adjacent cells. For instance, in FIG. 1, cell 122b is associated with adjacent cells 122a and 122c.

In FIG. 1, telecommunications network 100 is also connected to a remote server 130, which is communicatively couple a first database 132 and a second database 134. As further explained below with reference to Table 1, first database 132 stores a plurality of entries that include a respective entry for each geographical location of a plurality of geographical locations in an area that associates geographical coordinates for the geographical location with a cell identifier and a corresponding expected received signal value for each of an expected serving cell and a plurality of expected adjacent cells for the geographical location. Second database 134 stores collected cell identifiers associated with a cell serving mobile terminal 110 and sets of data for a number of cells adjacent to the cell serving mobile terminal 110.

FIG. 2 is a flowchart illustrating an exemplary embodiment of a process 200 of for computing a geographical location of mobile terminal 110 in cellular telecommunications network 100 in the exemplary communication system illustrated in FIG. 1.

More specifically, at block 210, the cell identifier and a received signal value of each of a cell serving mobile terminal 110 and a predetermined number of cells adjacent to the cell serving the mobile terminal are collected and stored in second database 134. The collected cell identifiers define identifiers of possible serving cells for the mobile terminal. At block 220, each entry from first database 132 for which the cell identifier of the expected serving cell matches any of the identifiers of possible serving cells for the mobile terminal is selected. At block 230, for each entry selected from the first database, each pair of a cell identifier and a corresponding expected received signal value for the geographical location is compared with a pair of a cell identifier and a corresponding received signal value of each possible serving cell for the mobile terminal. Based on this comparison, at block 240, each entry of the first database that has a number of pairs matching with the possible serving cells that is greater than a predetermined match threshold is identified. At block 250, the geographical coordinates of each entry identified at block 240 are processed to obtain the geographical location of said mobile terminal.

DETAILED DESCRIPTION OF THE PREFERRED EMBODIMENTS

The method of the present invention allows computation of the geographical location of a mobile terminal MT.

The mobile terminal MT is registered with a telecommunications network 1 comprising a plurality of cells CELL, each cell CELL being identified by a cell identifier CELL-ID and associated with a plurality of adjacent cells ADJ-CELL.

Each of the cells CELL and ADJ-CELL has a Mobile Country Code MCC, a Mobile Network Code MNC and a Location Area Code LAC.

Reference will be made hereinafter to a specific MCC, MNC and LAC triplet.

In accordance with the method of the present invention, a first database A is provided, which comprises, for each geographical location LONG,LAT of a plurality of geographical locations in an area LAC, the cell identifiers of the expected serving cell SERV-CELL-ID and of a plurality of expected adjacent cells ADJ-CELL-$ID_i$, as well as the corresponding expected received signal values of the expected serving cell RX-SERV-CELL and the expected adjacent cells RX-ADJ-$CELL_i$.

According to one embodiment, each geographical location is defined by a pair of space coordinates, i.e. the longitude LONG and the latitude LAT.

For each pair of space coordinates LONG,LAT, the database A contains the cell identifier of the expected serving cell SERV-CELL-ID and the corresponding expected received signal value RX-SERV-CELL, the cell identifiers of eight expected adjacent GSM cells ADJ-CELL-$ID_{1-8}$ with the corresponding eight expected received signal values RX-ADJ-$CELL_{1-8}$ and the cell identifiers of eight expected adjacent DCS cells ADJ-CELL-$ID_{9-16}$ and corresponding eight expected received signal values RX-ADJ-$CELL_{9-16}$.

Particularly, the database A is built using a statistical signal propagation model, by calculating the received signal attenuation projection in each pair of geographical coordinates LONG,LAT.

In a preferred exemplary embodiment, the database A has a 50 m resolution, which means that the longitude and latitude points LONG,LAT have a 50 m spacing.

The following table shows an exemplary structure of the database A for each longitude LONG and latitude LAT points.

TABLE 1

| LONG, LAT | |
|---|---|
| SERV-CELL-ID | RX-SERV-CELL |
| ADJ-CELL-$ID_1$ | RX-ADJ-$CELL_1$ |
| ADJ-CELL-$ID_2$ | RX-ADJ-$CELL_2$ |
| ADJ-CELL-$ID_3$ | RX-ADJ-$CELL_3$ |
| ADJ-CELL-$ID_4$ | RX-ADJ-$CELL_4$ |
| ADJ-CELL-$ID_5$ | RX-ADJ-$CELL_5$ |
| ADJ-CELL-$ID_6$ | RX-ADJ-$CELL_6$ |
| ADJ-CELL-$ID_7$ | RX-ADJ-$CELL_7$ |
| ADJ-CELL-$ID_8$ | RX-ADJ-$CELL_8$ |
| ADJ-CELL-$ID_9$ | RX-ADJ-$CELL_9$ |
| ADJ-CELL-$ID_{10}$ | RX-ADJ-$CELL_{10}$ |
| ADJ-CELL-$ID_{11}$ | RX-ADJ-$CELL_{11}$ |
| ADJ-CELL-$ID_{12}$ | RX-ADJ-$CELL_{12}$ |
| ADJ-CELL-$ID_{13}$ | RX-ADJ-$CELL_{13}$ |
| ADJ-CELL-$ID_{14}$ | RX-ADJ-$CELL_{14}$ |
| ADJ-CELL-$ID_{15}$ | RX-ADJ-$CELL_{15}$ |
| ADJ-CELL-$ID_{16}$ | RX-ADJ-$CELL_{16}$ |

The method includes a first step a) of collection of cell identifiers MT-SERV-CELL-ID,MT-ADJ-CELL-$ID_j$ and received signal values MT-RX-SERV-CELL,MT-RX-ADJ-$CELL_j$ of the cell serving the mobile terminal MT and a predetermined number J of cells adjacent to such serving cell.

It shall be noted that the Mobile Country, Network and Location Area Codes MCC, MNC and LAC for the serving cell having the cell identifier MT-SERV-CELL-ID associated thereto are also collected in step a).

The collected cell identifiers MT-SERV-CELL-ID, MT-ADJ-CELL-$ID_j$ define identifiers of possible serving cells for the mobile terminal MT.

According to one embodiment of the invention, in step a), the step of collecting the cell identifiers MT-ADJ-CELL-$ID_j$ and the received signal values MT-RX-ADJ-$CELL_j$ of a predetermined number J of cells adjacent to the serving cell comprising the steps of:

a1) collecting a plurality of data $BCCH_i$,$BSIC_j$ representative of the radio base stations of the cells adjacent to the serving cell and the corresponding actual received signal values MT-RX-ADJ-$CELL_i$, a2) selecting the collected data $BCCH_i$,$BSIC_j$ representative of the predetermined number J of adjacent cells and the corresponding actual received signal values MT-RX-ADJ-$CELL_j$, and a3) retrieving from a second database B the cell identifiers of the cells adjacent to the serving cell MT-ADJ-CELL-ID, associated with the selected data $BCCH_j$,$BSIC_j$.

Concerning the step a3), it shall be noted that $BCCH_j$ and $BSIC_j$ are retrieved with reference to the corresponding MCC, MNC and LAC codes of the serving cell identified by the cell identifier MT-SERV-CELL-ID.

According to one embodiment of the invention, in step a1), the mobile terminal MT receives the plurality of data $BCCH_i$, $BSIC_j$ representative of the base radio stations of the cells adjacent to the serving cell and the corresponding actual received signal values MT-RX-ADJ-$CELL_i$, and transmits such plurality of data $BCCH_i$,$BSIC_j$ and the corresponding actual received signal values MT-RX-ADJ-$CELL_i$ to a remote server REMOTE, where the steps a2) and a3) are carried out.

Particularly, the data of the plurality of data $BCCH_i$,$BSIC_j$ representative of the base radio stations of the cells adjacent to the serving cell include the frequency index BCCH and the identifier code BSIC of the base radio station of the adjacent cell. Occorre notare che il codice BSIC è formato dai codici NCC (Network Color Code) e BCC (Base station Color Code).

In accordance with the standard ETSI-3GPP, the mobile terminal MT can detect, store and transmit a plurality of information items concerning the base radio station of its own serving cell or the adjacent cells. For instance, WO 02/080606 discloses a method for allowing a mobile terminal to collect such information and transmit it to a remote server.

Particularly, the mobile terminal MT may collect the BCCH and BSIC values of the first six adjacent cells, whereas it only receives BCCH for the other adjacent cells. It shall be noted that the BCCH and BSIC values collected by the mobile terminal MT correspond to the parameters configured at network level. Therefore, in step a1), the mobile terminal MT receives the $BCCH_{1-6}$ and $BSIC_{1-6}$ values of the first six adjacent cells, and only receives $BCCH_{7-N}$ values for the other adjacent cells, where N is the number of adjacent cells whose data can be received by the mobile terminal.

In this respect, it shall be noted that, for a given MCC, MNC and LAC triplet, both the BCCH and the BSIC are required for unique identification of a cell. Therefore, in step a2), the collected data $BCCH_{1-6}$,$BSIC_{1-6}$ representative of the first six adjacent cells, as well as the corresponding actual received signal values MT-RX-ADJ-$CELL_{1-6}$ are selected, whereas the $BCCH_{7-N}$ values are omitted.

The second database B comprises, for each serving cell identifier MT-SERV-CELL-ID, a plurality of data BCCH(k), BSIC(k) representative of the base radio stations of the adjacent cells and the cell identifiers ADJ-CELL-ID(k) of these cells adjacent to the serving cell.

As mentioned above with reference to step a3), access to the database B allows retrieval of the cell identifiers of the cells adjacent to the serving cell MT-ADJ-CELL-ID$_{1-6}$, associated with the selected data BCCH$_{1-6}$,BSIC$_{1-6}$. According to one embodiment, the second database B is stored in the remote server REMOTE.

The following shows an exemplary structure of the database B for a cell identifier of a detected serving cell MT-SERV-CELL-ID, in which M values of pairs BCCH,BSIC are stored with their respective cell identifiers ADJ-CELL-ID.

TABLE 2

| MCC, MNC, LAC, MT-SERV-CELL-ID | | |
|---|---|---|
| BCCH (1) | BSIC (1) | ADJ-CELL-ID (1) |
| BCCH (2) | BSIC (2) | ADJ-CELL-ID (2) |
| BCCH (3) | BSIC (3) | ADJ-CELL-ID (3) |
| BCCH (4) | BSIC (4) | ADJ-CELL-ID (4) |
| BCCH (5) | BSIC (5) | ADJ-CELL-ID (5) |
| ... | ... | ... |
| ... | ... | ... |
| BCCH (M − 2) | BSIC (M − 2) | ADJ-CELL-ID (M − 2) |
| BCCH (M − 1) | BSIC (M − 1) | ADJ-CELL-ID (M − 1) |
| BCCH (M) | BSIC (M) | ADJ-CELL-ID (M) |

Each pair of values BCCH$_{1-6}$, BSIC$_{1-6}$ of the selected data is compared with each pair of values BCCH(k) BSIC(k) of the database B, with k=1 ... M, to determine the six respective cell identifiers ADJ-CELL-ID(k), for instance for k=1,2,4,5, M−2,M, identified above as MT-ADJ-CELL-ID$_{1-6}$. The result of step a) is shown below in table 3.

TABLE 3

| MT-SERV-CELL-ID | | |
|---|---|---|
| BCCH$_1$ | BSIC$_1$ | MT-ADJ-CELL-ID$_1$ |
| BCCH$_2$ | BSIC$_2$ | MT-ADJ-CELL-ID$_2$ |
| BCCH$_3$ | BSIC$_3$ | MT-ADJ-CELL-ID$_3$ |
| BCCH$_4$ | BSIC$_4$ | MT-ADJ-CELL-ID$_4$ |
| BCCH$_5$ | BSIC$_5$ | MT-ADJ-CELL-ID$_5$ |
| BCCH$_6$ | BSIC$_6$ | MT-ADJ-CELL-ID$_6$ |

According to one embodiment, the second database B is stored in the remote server REMOTE where the first database A is also stored. Otherwise, the two databases A and B may be stored in two distinct remote servers.

The cell identifier MT-SERV-CELL-ID and the received signal value MT-RX-SERV-CELL of the cell serving the terminal MT are directly received by the mobile terminal MT and are transmitted from the mobile terminal MT to the remote server REMOTE.

For the collection of the above mentioned data in step a), an application may be provided, residing on the SIM card of the mobile terminal MT or on the mobile terminal MT itself.

The transmission of MT-SERV-CELL-ID, MT-RX-SERV-CELL and BCCH$_{1-6}$,BSIC$_{1-6}$ and MT-RX-ADJ-CELL$_{1-6}$ data from the mobile terminal MT to the remote server REMOTE occurs, for instance, via a SMS interface. Otherwise, such data transmission may occur via a HTTP data interface.

Then, the method includes the steps of:

b) selecting from the first database A geographical coordinates LONG,LAT whose expected serving cell ID, SERV-CELL-ID, matches any one of the identifiers of possible serving cells MT-SERV-CELL-ID,MT-ADJ-CELL-ID$_{1-6}$, obtained from step a), c) comparing, for each geographical coordinate LONG, LAT selected in step b), pairs of cell identifiers and corresponding expected received signal values SERV-CELL-ID, RX-SERV-CELL and ADJ-CELL-ID$_{1-16}$,RX-ADJ-CELL$_{1-16}$ associated with the geographical coordinate LONG,LAT in the first database A with pairs of cell identifiers and corresponding actual received signal values of the possible serving cells MT-SERV-CELL-ID,MT-RX-SERV-CELL and MT-ADJ-CELL-ID$_{1-6}$,MT-RX-ADJ-CELL$_{1-6}$ to determine the geographical locations LONG, LAT having a number of matches NMATCH greater than a predetermined match threshold THRESHOLD-NMATCH, and d) processing the geographical locations LONG,LAT determined in step c) to obtain the geographical location of the mobile terminal MT.

According to one embodiment, the step d) includes the step of computing the mean of the geographical locations LONG, LAT, the mean so computed giving the geographical location of the mobile terminal MT.

According to a second embodiment, the step d) includes the step of computing the barycentre of the geographical locations LONG,LAT, the barycentre so computed giving the geographical location of the mobile terminal MT.

For example, assuming that the database A of the area LAC contains 50,000 geographical locations, defined by 10 pairs of longitude and latitude points LONG,LAT, the step b) might allow identification of 5,000 geographical locations whose expected serving cell ID, SERV-CELL-ID, matches any one of the identifiers of possible serving cells MT-SERV-CELL-ID,MT-ADJ-CELL-ID$_{1-6}$, obtained from step a).

Then, for each of the 5,000 longitude and latitude points LONG,LAT identified in step b), the pairs of cell identifiers and corresponding expected received signal values SERV-CELL-ID,RX-SERV-CELL and ADJ-CELL-ID$_{1-16}$,RX-ADJ-CELL$_{1-16}$ associated with the geographical coordinate LONG,LAT in the first database A are compared with the pairs of cell identifiers and corresponding actual received signal values of the possible serving cells MT-SERV-CELL-ID,MT-RX-SERV-CELL and MT-ADJ-CELL-ID$_{1-6}$,MT-RX-ADJ-CELL$_{1-6}$ to determine the geographical locations LONG,LAT having a number of matches NMATCH greater than a predetermined match threshold THRESHOLD-NMATCH, e.g. NMATCH greater than 2.

After this step, about ten longitude and latitude points to be processed might be typically obtained, to determine the location of the mobile terminal MT by mean or barycentre computation.

According to one embodiment, the predetermined match threshold THRESHOLD-NMATCH is equal to or greater than 2.

According to one embodiment, the first database A is stored in the remote server REMOTE, wherefore the selection step b), the comparison step c) and the computation step d) are carried out in the remote server REMOTE.

The comparison step c) comprises the steps of:

c1) comparing, for each selected geographical coordinate LONG,LAT, each cell identifier SERV-CELL-ID,ADJ-CELL-ID$_{1-16}$ associated with the geographical coordinate LONG,LAT in the first database A with each cell identifier of the possible serving cells MT-SERV-CELL-ID,MT-ADJ-CELL-ID$_{1-6}$, c2) comparing, for the pairs of matching cell identifiers obtained from step c1), the corresponding received signal values RX-SERV-CELL,MT-RX-SERV-CELL and RX-ADJ-CELL$_j$,MT-RX-ADJ-CELL$_j$, the match between the pairs of cell identifiers obtained from step c1) being determined based on the result of the step c2) in which the corresponding received signal values are compared.

Advantageously, the step c2) of comparing the corresponding received signal values comprises the step of computing the difference between the corresponding received signal values and determining a match when such difference is below a predetermined signal threshold RX-THRESHOLD.

According to one embodiment, such predetermined signal threshold RX-NMATCH is lower than ±10 dBm, and preferably about ±5 dBm.

Substantially, a match is only deemed to be valid if the two identifiers match and if the difference between the corresponding expected and actual received signal values is below a threshold, preferably ±5 dBm.

In this case, the compared pair is deemed to be valid and contributes to the number NMATCH of matches identified for each geographical location.

As clearly shown in the above description, the method of the present invention fulfills the needs and obviates prior art drawbacks as set out in the introduction of this disclosure.

Particularly, the method of the invention allows simple computation of a mobile terminal location by processing a small amount of data collected by the mobile terminal.

Those skilled in the art will obviously appreciate that a number of changes and variants may be made to the method of the invention as described hereinbefore to meet specific needs, without departure from the scope of the invention, as defined in the following claims.

The invention claimed is:

1. A method for computing a geographical location of a mobile terminal in a cellular telecommunications network that comprises a plurality of cells, each cell being identified by a cell identifier and associated with a plurality of adjacent cells, the method comprising:
   a) collecting the cell identifier and a received signal value of each of a cell serving said mobile terminal and a predetermined number of cells adjacent to said cell serving said mobile terminal, said collected cell identifiers defining identifiers of possible serving cells for the mobile terminal,
   b) selecting, from a first database that comprises a plurality of entries including a respective entry for each geographical location of a plurality of geographical locations in an area that associates geographical coordinates for the geographical location with the cell identifier and a corresponding expected received signal value for, each of an expected serving cell and a plurality of expected adjacent cells for the geographical location, each entry for which the cell identifier of the expected serving cell matches any of said identifiers of possible serving cells for'the mobile terminal,
   c) comparing, for each entry selected from the first database, each pair of a cell identifier and a corresponding expected received signal value for the geographical location with each pair of a cell identifier and a, corresponding received signal value of each possible serving cell for the mobile terminal to determine each entry of the first database that has a number of pairs matching with the possible serving cells that is greater than a predetermined match threshold, and
   d) processing said geographical coordinates of each determined entry for which the number of pairs matching with the possible serving cells is greater than the predetermined match threshold to obtain the geographical location of said mobile terminal, wherein collecting the cell identifiers and the received signal values of the predetermined number of cells adjacent to said cell serving said mobile terminal comprises:
      a1) collecting a plurality of data representative of radio base stations of the plurality of adjacent cells associated with said cell serving said mobile terminal and corresponding actual received signal values for the plurality of adjacent cells associated with said cell serving said mobile terminal,
      a2) selecting a set of data from the collected plurality data representative of said predetermined number of cells adjacent to said cell serving cell for the mobile terminal and the corresponding actual received signal values for said predetermined number of cells adjacent to said cell serving said mobile terminal
      a3) retrieving, from a second database, cell identifiers associated with said cell serving said mobile terminal and the selected set of data for the predetermined number of cells adjacent to said cell serving said mobile terminal; and
   wherein said mobile terminal receives said plurality of data and the corresponding actual received signal values for said predetermined number of cells adjacent to said cell serving said mobile terminal, and transmits said plurality of data and said corresponding actual received signal values to a remote server, and wherein selection of the set of data and retrieval of the cell identifiers associated with said cell serving said mobile terminal and the selected set of data from the second database is carried out in said remote server.

2. A method for computing a geographical location of a mobile terminal as claimed in claim 1, wherein said second database comprises, for each serving cell identifier, a plurality of data representative of the base radio stations of the plurality of adjacent cells associated with a serving cell identified by the serving cell identifier and the cell identifiers of said plurality of adjacent cells associated with said serving cell.

3. A method for computing a geographical location of a mobile terminal as claimed in claim 2, wherein said second database is stored in said remote server.

4. A method for computing a geographical location of a mobile terminal as claimed in claim 1, wherein said plurality of data representative of the base radio stations of the cells adjacent to said cell serving said mobile terminal includes a frequency index and an identification code of each base radio station of a cell adjacent to said cell serving said mobile terminal.

5. A method for computing a geographical position of a mobile terminal as claimed in claim 1, wherein the cell identifier and the received signal value of the cell serving said terminal is collected by said mobile terminal and transmitted by said mobile terminal to a remote server.

6. A method for computing a geographical location of a mobile terminal as claimed in claim 1, wherein said first database is stored in a remote server, and wherein said selection b), comparison c) and computing d) are carried out in the remote server.

7. A method for computing a geographical location of a mobile terminal as claimed in claim 1, wherein said predetermined match threshold is equal to or greater than 2.

8. A method for computing a geographical location of a mobile terminal as claimed in claim 1, wherein processing said geographical coordinates of each determined entry for which the number of pairs matching with the possible serving cells is greater than the predetermined match threshold comprises computing a mean of said geographical coordinates of the determined entries to obtain the geographical location of said mobile terminal.

9. A method for computing a geographical location of a mobile terminal as claimed in claim 1, wherein processing said geographical coordinates of each determined entry for which the number of pairs matching with the possible serving cells is greater than the predetermined match threshold comprises computing a barycentre of said geographical coordinates of the determined entries to obtain the geographical location of said mobile terminal.

10. A method for computing a geographical location of a mobile terminal in a cellular telecommunications network that comprises a plurality of cells, each cell being identified by a cell identifier and associated with a plurality of adjacent cells, the method comprising:

a) collecting the cell identifier and a received signal value of each of a cell serving said mobile terminal and a predetermined number of cells adjacent to said cell serving said mobile terminal, said collected cell identifiers defining identifiers of possible serving cells for the mobile terminal, b) selecting, from a first database that comprises a plurality of entries including a respective entry for each geographical location of a plurality of geographical locations in an area that associates geographical coordinates for the geographical location with the cell identifier and a corresponding expected received signal value for each of an expected serving cell and a plurality of expected adjacent cells for the geographical location, each entry for which the cell identifier of the expected serving cell matches any of said identifiers of possible serving cells for the mobile terminal, c) comparing, for each entry selected from the first database, each pair of a cell identifier and a corresponding expected received signal value for the geographical location with each pair of a cell identifier and a corresponding received signal value of each possible serving cell for the mobile terminal to determine each entry of the first database that has a number of pairs matching with the possible serving cells that is greater than a predetermined match threshold, and d) processing said geographical coordinates of each determined entry for which the number of pairs matching with the possible serving cells is greater than the predetermined match threshold to obtain the geographical location of said mobile terminal, wherein said comparison c) comprises:

c1) comparing, for each selected entry in said first database, each cell identifier associated with said geographical coordinates of the entry in said first database with each cell identifier of said possible serving cells, c2) comparing, for each match between a cell identifier associated with the geographical coordinates of an entry and the cell identifier of a possible serving cell, the corresponding expected received signal value for the cell identifier in the entry and the received signal value collected for the possible serving cell to determine whether the pair of the cell identifier in the entry and the corresponding received signal value for the cell identifier in the entry matches with the cell identifier and the received signal value collected for the possible serving cell, and wherein comparing the corresponding expected received signal value for a cell identifier in an entry of the first database and the received signal value collected for a possible serving cell comprises computing a difference between the corresponding expected received signal value and the received signal value and determining a match when the difference is below a predetermined signal threshold.

11. A method for computing a geographical location mobile terminal as claimed in claim 10, wherein said predetermined signal threshold is lower than ±10 dBm.

12. A method for computing a geographical location of a mobile terminal as claimed in claim 11, wherein said predetermined signal threshold is ±5 dBm.

* * * * *